(12) United States Patent
Chiba et al.

(10) Patent No.: US 10,773,576 B2
(45) Date of Patent: Sep. 15, 2020

(54) RESIN BACK DOOR

(71) Applicants: TOYOTA JIDOSHA KABUSHIKI KAISHA, Toyota-shi, Aichi-ken (JP); TOYOTA JIDOSHA KYUSHU KABUSHIKI KAISHA, Miyawaka-shi, Fukuoka-ken (JP)

(72) Inventors: Kenji Chiba, Tokai (JP); Takayuki Okubo, Toyota (JP); Kiyokazu Nitta, Miyoshi (JP)

(73) Assignees: TOYOTA JIDOSHA KABUSHIKI KAISHA, Toyota (JP); TOYOTA JIDOSHA KYUSHU KABUSHIKI KAISHA, Miyawaka (JP)

( * ) Notice: Subject to any disclaimer, the term of this patent is extended or adjusted under 35 U.S.C. 154(b) by 13 days.

(21) Appl. No.: 16/216,375

(22) Filed: Dec. 11, 2018

(65) Prior Publication Data
US 2019/0184797 A1 Jun. 20, 2019

(30) Foreign Application Priority Data
Dec. 19, 2017 (JP) ................. 2017-242327

(51) Int. Cl.
*B60J 5/10* (2006.01)
*B60J 5/04* (2006.01)
(52) U.S. Cl.
CPC ............. *B60J 5/107* (2013.01); *B60J 5/0481* (2013.01); *B60J 5/101* (2013.01)
(58) Field of Classification Search
CPC . B60J 5/0481; B60J 5/101; B60J 5/102; B60J 5/107

USPC ................................... 296/146.8, 56
See application file for complete search history.

(56) References Cited

U.S. PATENT DOCUMENTS

| | | | | |
|---|---|---|---|---|
| 8,690,220 | B2 * | 4/2014 | Tsukiyama | B60J 5/101 |
| | | | | 296/56 |
| 10,449,841 | B2 * | 10/2019 | Ikeda | B62D 29/043 |
| 2007/0145773 | A1 * | 6/2007 | Saitoh | B60J 5/101 |
| | | | | 296/146.8 |
| 2007/0200389 | A1 * | 8/2007 | Ina | B60J 5/101 |
| | | | | 296/180.1 |
| 2018/0194407 | A1 * | 7/2018 | Adachi | B60J 5/101 |
| 2019/0193534 | A1 * | 6/2019 | Chiba | B60J 5/102 |
| 2019/0217690 | A1 * | 7/2019 | Chiba | B60J 5/101 |
| 2020/0009949 | A1 * | 1/2020 | Tichy | B29C 66/112 |

FOREIGN PATENT DOCUMENTS

| | | |
|---|---|---|
| JP | 2011-136606 A | 7/2011 |
| JP | 2015-030306 A | 2/2015 |
| JP | 2017-132347 A | 8/2017 |

* cited by examiner

*Primary Examiner* — Jason S Morrow
(74) *Attorney, Agent, or Firm* — Oliff PLC

(57) ABSTRACT

A resin back door includes an inner panel, an upper outer panel, and a reinforcing member fixed to the inner panel, and the upper outer panel and the reinforcing member are fastened with a bolt. In the resin back door, the reinforcing member has a flat plate portion extending along an inner surface of the upper outer panel, the reinforcing member has a fastened portion formed as an arm extending after bending from the flat plate portion toward the upper outer panel, and the upper outer panel has a fastened portion formed as a thin thickness portion having a plate thickness smaller than that of a general portion.

2 Claims, 6 Drawing Sheets

DETAILS OF PORTION D

RESIN BACK DOOR

CROSS REFERENCE TO RELATED APPLICATION

The disclosure of Japanese Patent Application No. 2017-242327 filed on Dec. 19, 2017 including the specification, claims, drawings, and abstract is incorporated herein by reference in its entirety.

TECHNICAL FIELD

The present disclosure relates to a structure of a fastened portion between an outer panel and a reinforcing member fixed to an inner panel, in a resin back door.

BACKGROUND

In recent years, many vehicle doors made of resin have been used. The doors made of resin have a reduced weight, but as compared with doors made from steel plate, ensuring rigidity is difficult. For this reason, metal reinforcing members have been proposed, each of which is attached in a hollow space defined between a resin inner panel and a resin outer panel.

For example, in JP 2011-136606 A, there is proposed a structure which has a metal reinforcing member interposed between a peripheral edge portion of a resin inner panel and a peripheral edge portion of a resin outer panel to be fixed with an adhesive.

SUMMARY

Meanwhile, the resin inner panel, the outer panel, and the metal reinforcing member each have a manufacturing tolerance. Therefore, in the structure described in JP 2011-136606 A, during assembly the peripheral edge of the resin inner panel constituting a design surface and the peripheral edge of the outer panel may be deformed in order to conform to a peripheral edge portion of the metal reinforcing member having high strength.

For this reason, there has been studied a structure in which a metal reinforcing member is fixed not to the peripheral edge portion of an inner panel but to the inner side thereof. In this structure, the metal reinforcing member is fixed to the inner side of the resin inner panel so that the peripheral edge portion of the metal reinforcing member and the peripheral edge portion of the resin inner panel are separated from each other, and deformation of the peripheral edge portion of the inner panel can be suppressed during assembly of the reinforcing member. Furthermore, adhesion of the peripheral edge portion of an outer panel to the peripheral edge portion of the inner panel can suppress deformation of the peripheral portion of the outer panel.

However, due to a manufacturing tolerance of each of the resin inner panel, the outer panel, and the metal reinforcing member, this structure causes dimensional variation in between surfaces of the reinforcing member and the outer panel. Therefore, when the reinforcing member and the outer panel are fastened with bolts or the like to ensure the strength of the outer panel or a spoiler or the like attached on the outside of the outer panel, via spacers of the same thickness, the outer panel may be deformed toward the reinforcing member and a design surface of the outer panel may be deformed.

Thus, an object of the present disclosure is to suppress deformation of a design surface of a resin outer panel when the outer panel and the reinforcing member are fastened, in a resin back door in which the reinforcing member is fixed to a resin inner panel.

Solution to Problem

The resin back door according to the present disclosure includes a resin inner panel, a resin outer panel, and a metal reinforcing member. The metal reinforcing member is disposed in a hollow space defined by the inner panel and the outer panel, and is fixed to the inner panel. The outer panel and the reinforcing member are fastened with a fastener. In the resin back door, the reinforcing member has a flat plate portion extending along an inner surface of the outer panel, the reinforcing member has a fastened portion formed as an arm extending after bending from the flat plate portion toward the outer panel, and the outer panel has a fastened portion formed as a thin thickness portion having a plate thickness smaller than that of a portion other than the fastened portion.

When the fastened portion of the reinforcing member is formed as an arm extending after bending from the flat plate portion toward the outer panel, the bent portions of the arm are hardened by work hardening, and a portion located between the bent portions of the arm is easily bent. Therefore, the portion located between the bent portions of the arms is bent to fasten the outer panel and the reinforcing member with the fastener without pulling the outer panel toward the reinforcing member, and deformation of the design surface of the outer panel can be suppressed. Furthermore, since the fastened portion of the outer panel is formed as the thin thickness portion, the thin thickness portion has a reduced section modulus and reduced flexural rigidity. Therefore, the outer panel is deformed at the thin thickness portion to accommodate a dimensional variation between surfaces of the outer panel and the reinforcing member, thereby suppressing deformation of the design surface of the outer panel due to fastening.

As described above, in the resin back door according to the present disclosure, when the outer panel and the reinforcing member are fastened with a fastener, such as bolts, the arum as the fastened portion of the reinforcing member is bent and deformed toward the outer panel, and the thin thickness portion as the fastened portion of the outer panel is flexibly deformed toward the reinforcing member. Therefore, a dimensional variation between surfaces of the outer panel and the reinforcing member is accommodated and deformation of the design surface of the outer panel due to fastening is suppressed.

The resin back door according to the present disclosure may include a resin spoiler fastened to the outer panel and the reinforcing member with a fastener, at an upper end portion in a vehicle vertical direction.

Thereby, it is possible to fasten the spoiler to the reinforcing member while suppressing the deformation of the design surface of the outer panel.

Advantageous Effects of Invention

According to an embodiment of the present disclosure, a resin back door in which a reinforcing member is fixed to a resin inner panel is provided to suppress deformation of a design surface of an outer panel when the resin outer panel is fastened to the reinforcing member.

BRIEF DESCRIPTION OF DRAWINGS

Embodiment(s) of the present disclosure will be described by reference to the following figures, wherein.

DESCRIPTION OF EMBODIMENTS

Figure 1:
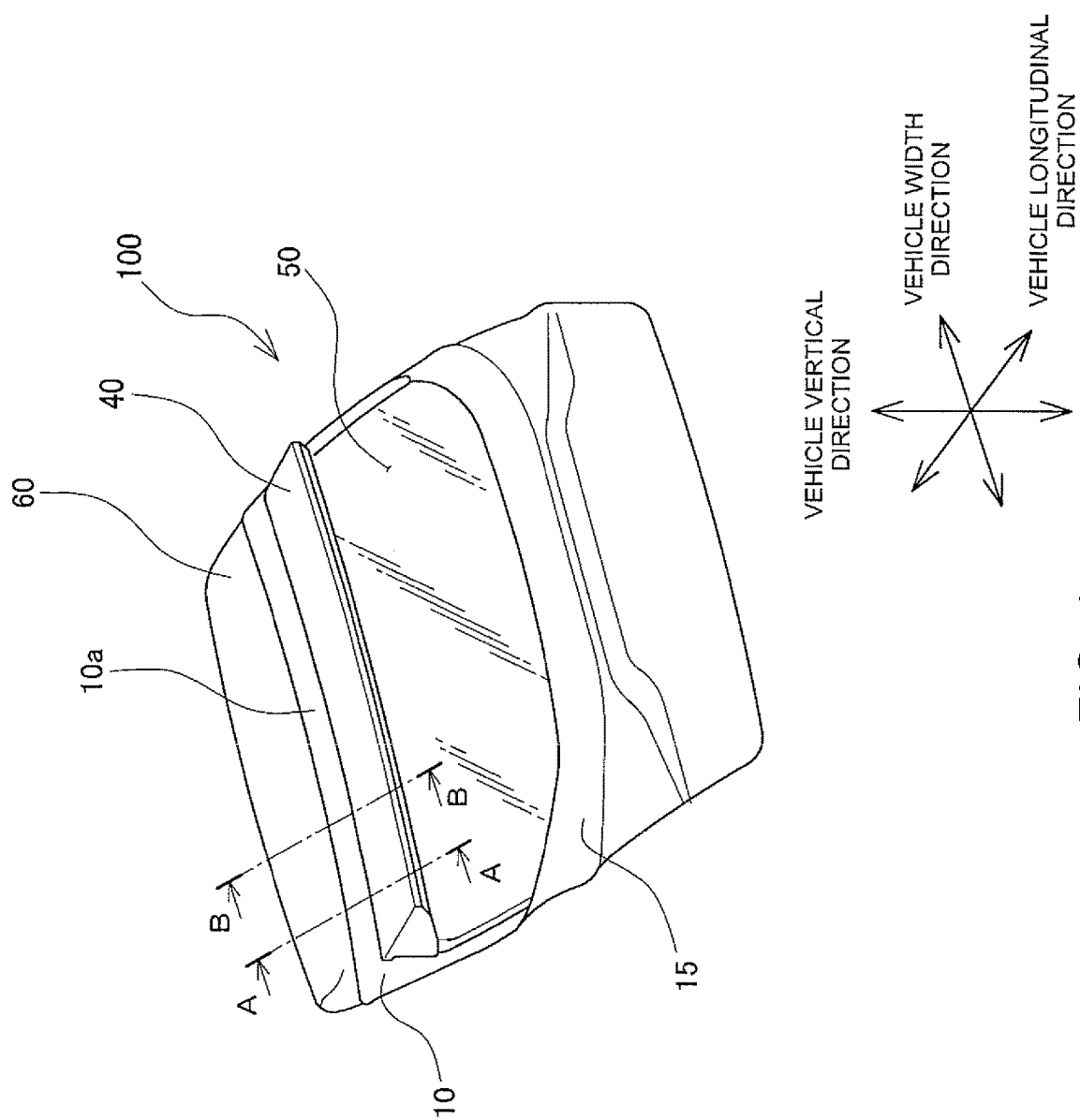
FIG. 1 is a perspective view of a resin back door according to an embodiment.
Figure 2A:
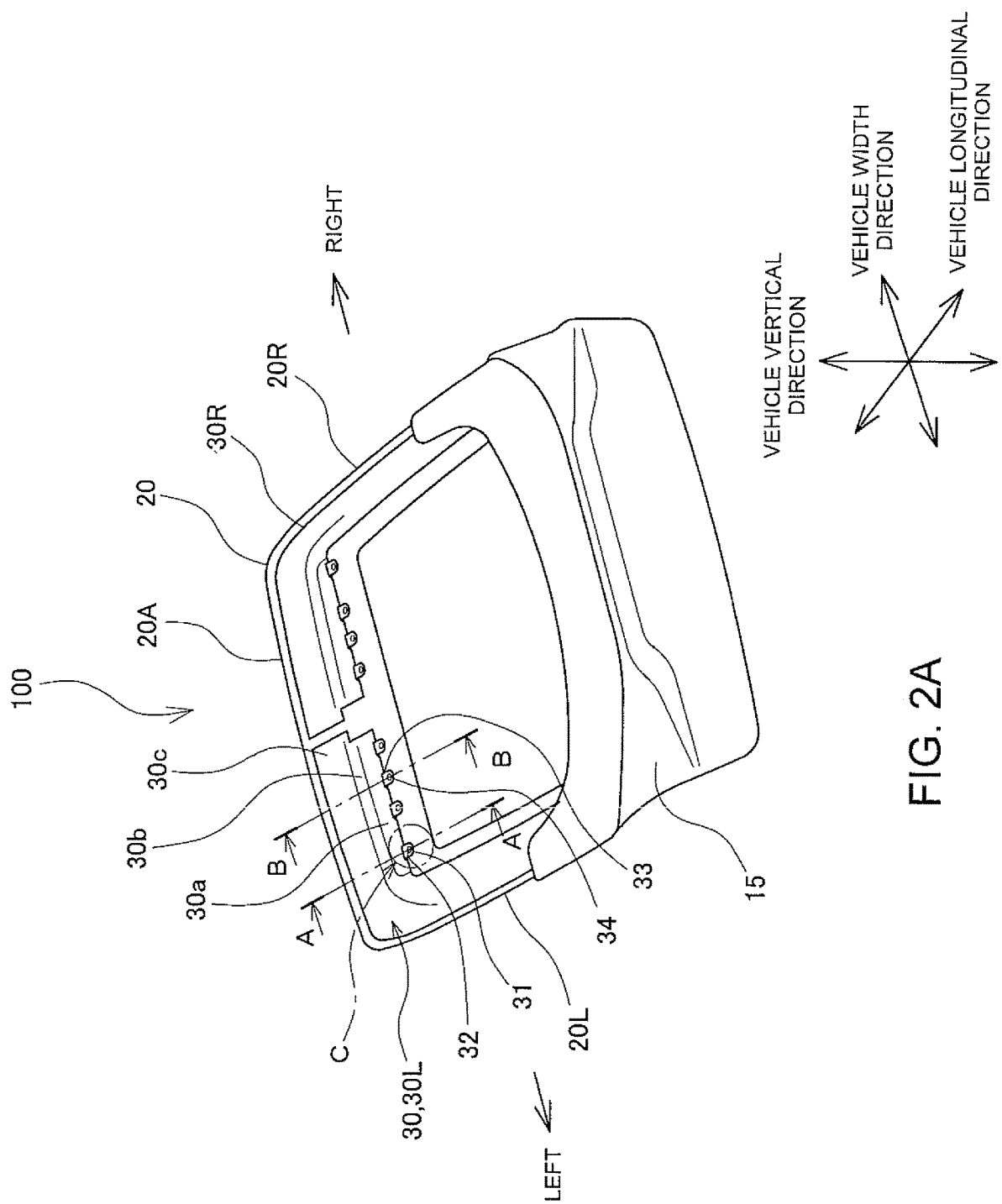
FIG. 2A is a perspective view of the resin back door of FIG. 1 from which a spoiler and an upper outer panel are removed.

Hereinafter, a resin back door 100 according to embodiments will be described with reference to the drawings. The resin back door 100 includes a resin upper outer panel 10 and a lower outer panel 15, as illustrated in FIG. 1, and a resin inner panel 20 and a metal reinforcing member 30 fixed to the inner panel 20, as illustrated in FIG. 2A. The reinforcing member 30 includes a left shoulder reinforcing member 30L and a right shoulder reinforcing member 30R. The left shoulder reinforcing member 30L has a substantially L-shape extending along an upper side portion 20A and a left side portion 20L of the inner panel 20, and the right shoulder reinforcing member 30R has a substantially L-shape extending along the upper side portion 20A and a right side portion 20R of the inner panel 20. Since the left shoulder reinforcing member 30L and the right shoulder reinforcing member 30R are symmetrical to each other, in the following description only the left shoulder reinforcing member 30L will be described as the reinforcing member 30. As illustrated in FIG. 1, a back door glass 50 is mounted on the upper side of the upper outer panel 10 in a vehicle vertical direction. Furthermore, a resin spoiler 40 is attached to an upper end portion of the upper outer panel 10 in the vehicle vertical direction. The resin back door 100 is mounted to a roof panel 60 by a mounting hinge, which is not illustrated. The upper outer panel 10 has an outer surface serving as a design surface 10a.

Figure 3:
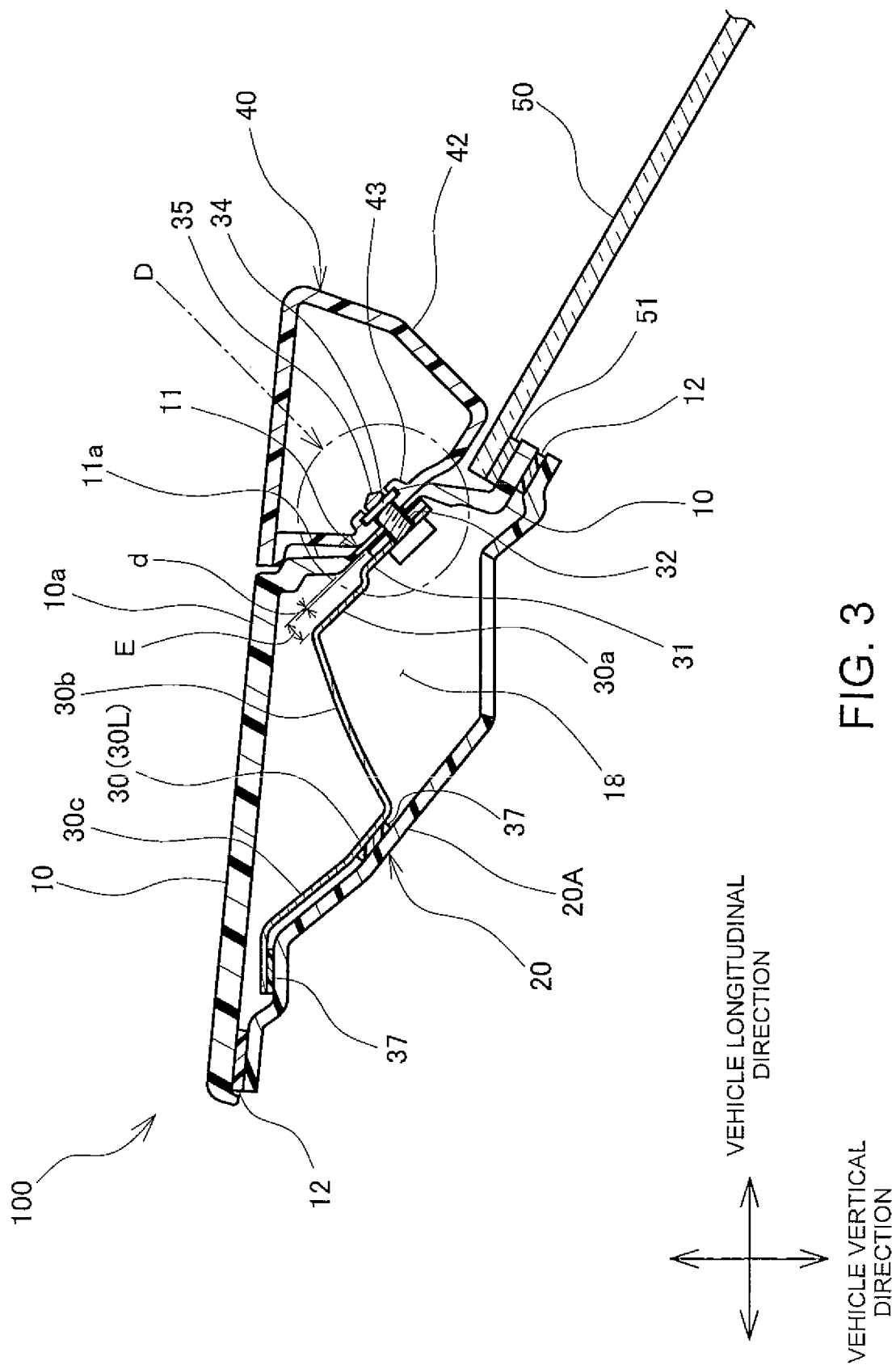
FIG. 3 is a cross-sectional view taken along a line A-A of FIGS. 1 and 2A.

As illustrated in FIG. 3, the upper side portion 20A of the inner panel 20 has a cross-section having a substantially groove shape recessed upward, and the upper portion of the upper outer panel 10 has a cross-sectional shape of a substantially groove shape recessed downward. Therefore, as illustrated in FIG. 3, when the inner panel 20 is combined with the upper outer panel 10, a hollow space 18 is defined therein.

As illustrated in FIGS. 2A and 3, in the hollow space 18 defined at an upper portion of the inner panel 20, the metal reinforcing member 30 having a substantially L-shape form is disposed and fixed. As illustrated in FIGS. 2A and 3, the reinforcing member 30 has a portion connected to the upper side portion 20A of the inner panel 20, and the portion has a bent-plate structure including a fixed portion 30c fixed to the inner panel 20, an extending portion 30b extending from the fixed portion 30c toward the upper outer panel 10, and a flat plate portion 30a extending from the extending portion 30b while maintaining a clearance E of width substantially in parallel with an inner surface of the upper outer panel 10. The fixed portion 30c of the reinforcing member 30 is fixedly bonded to the inner panel 20 with a thick adhesive 37 at a place slightly inside from a peripheral edge portion of the inner panel 20. A portion other than the adhesion portion of the reinforcing member 30 has a clearance between the reinforcing member 30 and a surface of the inner panel 20 positioned on the side of the hollow space 18. A peripheral edge portion of the upper outer panel 10 is fixed to the peripheral edge portion of the inner panel 20 with an adhesive 12.

Figure 2B:
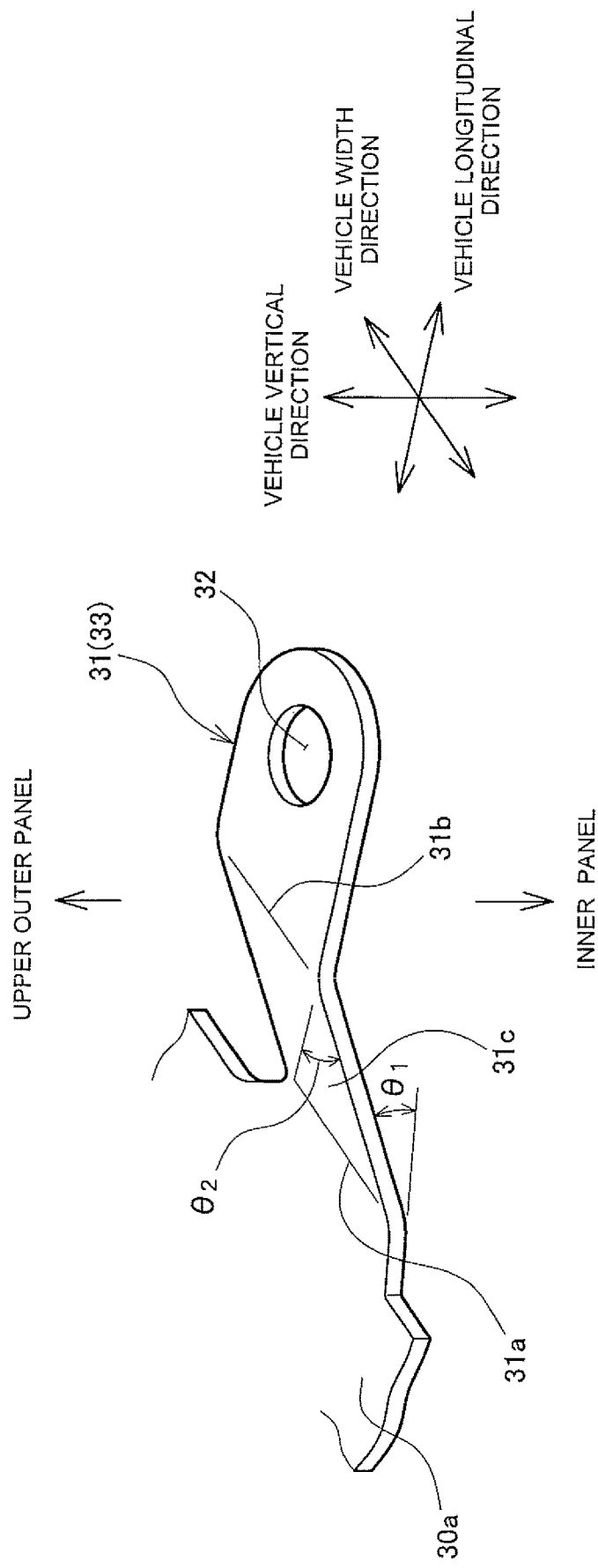
FIG. 2B is a detailed perspective view of a portion C of FIG. 2A.
Figure 4:
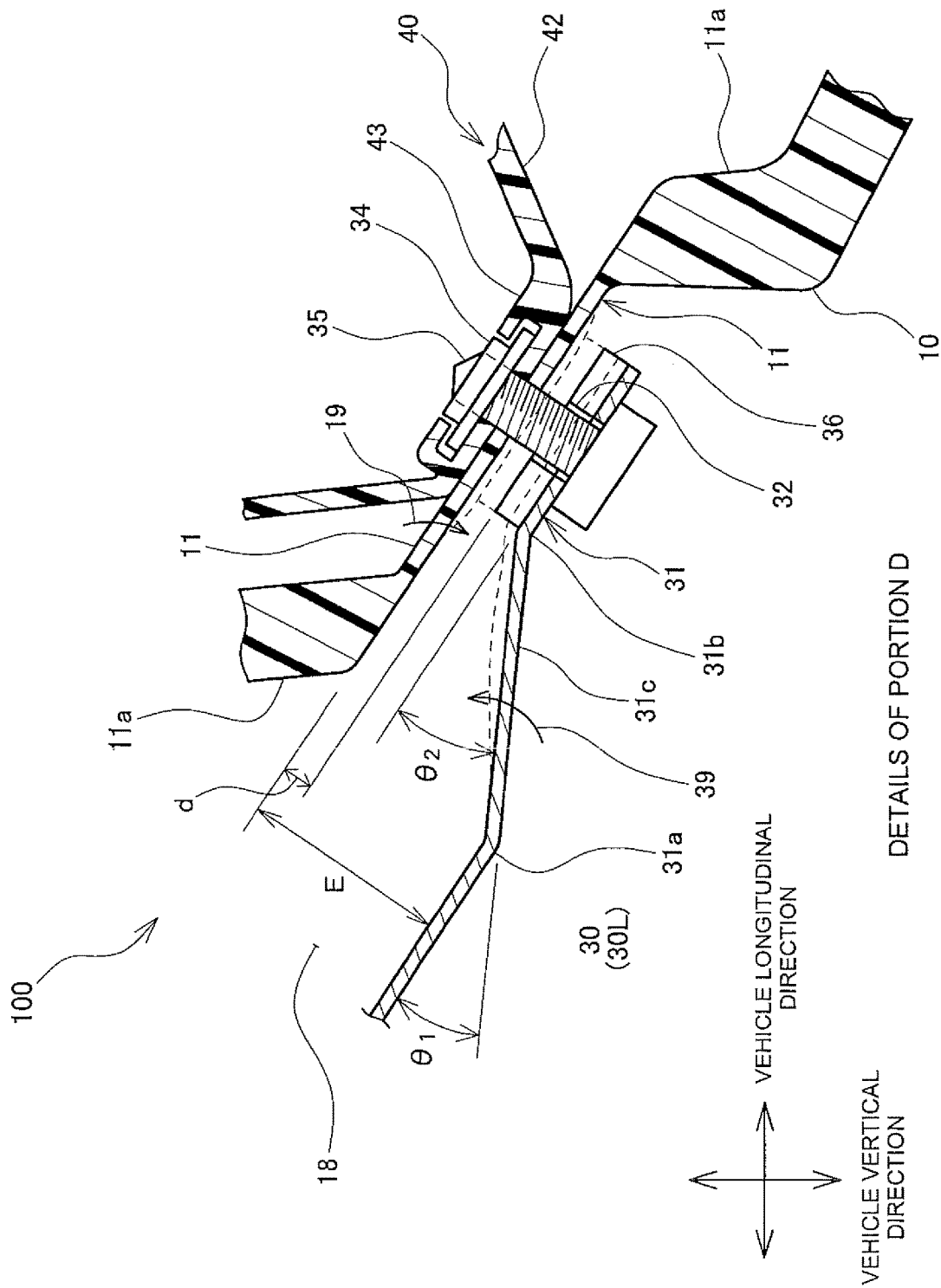
FIG. 4 is a detailed cross-sectional view of a portion D of FIG. 3.

As illustrated in FIGS. 2B and 4, the reinforcing member 30 is provided with an arm 31 extending after bending obliquely from the flat plate portion 30a toward the upper outer panel 10. The arm 31 includes a bent portion 31a on the root side, a bent portion 31b on an end side, and an extending portion 31c positioned between the bent portions 31a and 31b. The bent portion 31a on the root side has a bending angle $\theta 1$ and the bent portion 31b on the end side has a bending angle $\theta 2$. The arm 31 has an end substantially parallel to the upper outer panel 10, and the end is provided with a hole 32 through which a bolt 35 passes. The bent portions 31a and 31b of the arm 31 are hardened by work hardening, and the extending portion 31c positioned between the bent portions 31a and 31b of the arm 31 is easily bent. Furthermore, a fastened portion of the upper outer panel 10 fastened by the bolt 35 is provided with a thin thickness portion 11 having a plate thickness smaller than the plate thickness of a surrounding general portion 11a. The thin thickness portion 11 has a reduced section modulus and a reduced flexural rigidity as compared with the general portion 11a other than the thin thickness portion 11.

As illustrated in FIG. 3, the resin spoiler 40 includes a main body 42 and a nut-holding portion 43 configured to hold a nut 34. The main body 42 is fastened to the arm 31 of the reinforcing member 30 and the upper outer panel 10 with the bolt 35 and the nut 34 which serve as a fastener via a spacer 36.

As illustrated in FIG. 4, when assembling the resin spoiler 40, the resin spoiler 40 is aligned with the thin thickness portion 11 at the upper end of the upper outer panel 10 in the vehicle vertical direction, the bolt 35 is inserted into the hole 32 in the arm 31 of the reinforcing member 30, and the bolt 35 is threaded into the nut 34 held by the nut-holding portion 43 of the resin spoiler 40. Before the bolt 35 is tightened, a clearance having a width d is defined between the thin thickness portion 11 of the upper outer panel 10 and the spacer 36.

The bent portions 31a and 31b of the arm 31 are hardened by work hardening, and the extending portion 31c positioned between the bent portions 31a and 31b is easily bent. Therefore, as indicated by a broken line and an arrow 39 in FIG. 4, when the bolt 35 is tightened, the extending portion 31c is bent and deformed, and the end of the arm 31 of the reinforcing member 30 is moved toward the thin thickness portion 11 of the upper outer panel 10. Furthermore, the section modulus and the flexural rigidity of the thin thickness portion 11 of the upper outer panel 10 are small, and the thin thickness portion 11 is flexibly deformed toward the reinforcing member 30 as indicated by an arrow 19. The arm 31 and the thin thickness portion 11 are deformed until a sum of an amount of bending deformation of the arm 31 and an amount of flexible deformation of the thin thickness portion 11 reaches the width d of the clearance. Then, the main body 42 is fastened to the upper outer panel 10 and the reinforcing member 30 with the bolt 35 and the nut 34 via the spacer 36. As described above, a dimensional variation between surfaces of the upper outer panel 10 and the reinforcing member 30 is accommodated by the bending deformation of the arm 31 of the reinforcing member 30 and the flexible deformation of the thin thickness portion 11 of the upper outer panel 10. The bending angles $\theta 1$ and $\theta 2$ of the bent portions 31a and 31b of the arm 31 and the plate thickness of the thin thickness portion 11 are adjusted so as not to leave plastic deformation when the bolt 35 is tightened. Therefore, the arm 31 and the thin thickness portion 11 are resiliently deformed.

Since the thin thickness portion 11 is surrounded by the general portion 11a having a large plate thickness, deformation of the thin thickness portion 11 has little influence on the deformation of the general portion 11a, and the design surface 10a of the upper outer panel 10 located farther from the general portion 11a is little affected. Therefore, in the resin back door 100 according to the embodiment, the resin spoiler 40 is capable of being fastened to the reinforcing member 30 with the bolt 35 and the nut 34 while suppressing deformation of the design surface 10a of the upper outer panel 10.

As described above, in the resin back door 100 according to the embodiment, when the upper outer panel 10 and the reinforcing member 30 are fastened with the bolt 35 and the nut 34, the arm 31 as the fastened portion of the reinforcing member 30 is bent and deformed toward the upper outer panel 10, and the thin thickness portion 11 as the fastened portion of the upper outer panel 10 is flexibly deformed toward the reinforcing member 30. Therefore, a dimensional variation between surfaces of the upper outer panel 10 and the reinforcing member 30 is accommodated, and deformation of the design surface 10a of the upper outer panel 10 due to fastening is suppressed.

Figure 5:
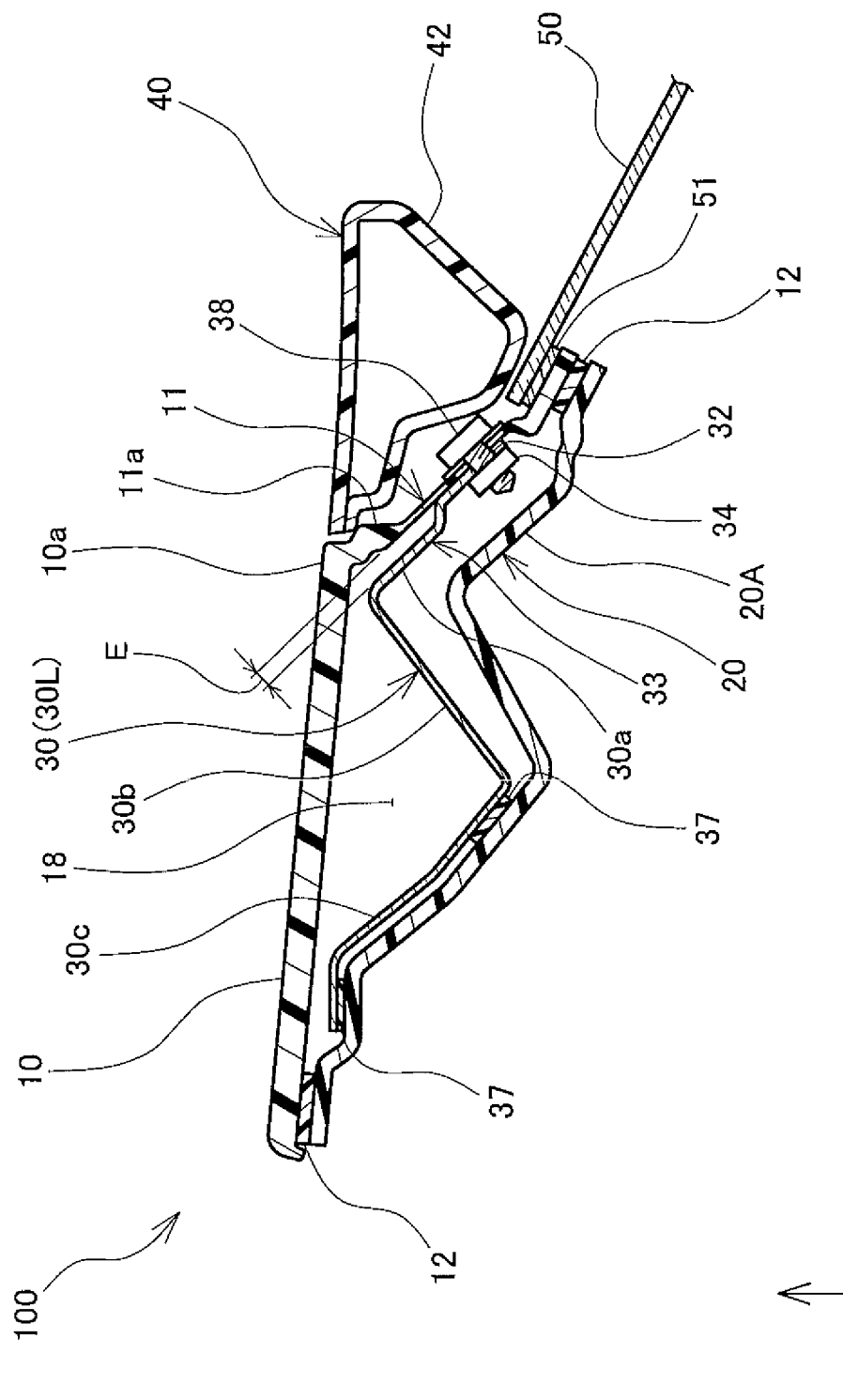
FIG. 5 is a cross-sectional view taken along a line B-B of FIGS. 1 and 2A.

Next, another embodiment will be described with reference to FIG. 5. FIG. 5 is a cross-sectional view taken along a line B-B of FIGS. 1 and 2A, illustrating a structure in which the upper outer panel 10 is fastened to the reinforcing member 30 with a bolt 38. Portions similar to those of the above embodiment described with reference to FIGS. 1 to 4 are denoted by the same reference numerals, and descriptions thereof are omitted.

As illustrated in FIG. 5, the reinforcing member 30 includes an arm 33 having a structure similar to that of the arm 31 described with reference to FIG. 2B, and in the arm 33, the nut 34 into which the bolt 38 is threaded is fixed to the hole 32 from the side of the inner panel 20.

As described above with reference to FIG. 4, a clearance is initially defined between the thin thickness portion 11 of the upper outer panel 10 and the arm 33 of the reinforcing member 30. When the thin thickness portion 11 of the upper outer panel 10 and the arm 33 of the reinforcing member 30 are fastened by tightening of the bolt 38 and the nut 34, the arm 33 and the thin thickness portion 11 are deformed to accommodate the clearance. Therefore, the thin thickness portion 11 of the upper outer panel 10 and the arm 33 are capable of being fastened with the bolt 38 and the nut 34. The deformation of the thin thickness portion 11 does not affect the design surface 10a of the upper outer panel 10. Therefore, the resin spoiler 40 is fastened to the reinforcing member 30 with the bolt 38 and the nut 34 while suppressing deformation of the design surface 10a of the upper outer panel 10.

As illustrated in FIG. 5, the back door glass 50 has an upper side fixed onto the upper outer panel 10 via a urethane material 51. Fastening the upper outer panel 10 and the reinforcing member 30 with the bolt 38 and the nut 34 enables an increase in the rigidity of a mounted portion of the back door glass 50. Thus, the vibration of the back door glass 50 is suppressed and further, booming noise in the vehicle can be suppressed.

As described above, in the resin back door 100 according to the present embodiment, the upper outer panel 10 and the reinforcing member 30 are fastened with the bolt 38 and the nut 34 to improve the rigidity of the resin back door 100 to suppress the vibration of the resin back door 100 while suppressing the deformation of the design surface 10a of the upper outer panel 10.

The invention claimed is:

1. A resin back door comprising:
a resin inner panel;
a resin outer panel; and
a metal reinforcing member disposed in a hollow space defined by the inner panel and the outer panel, and fixed to the inner panel,
the outer panel and the reinforcing member being fastened with a fastener,
wherein the reinforcing member has a flat plate portion extending along an inner surface of the outer panel,
the reinforcing member has a fastened portion formed as an arm extending after bending from the flat plate portion toward the outer panel, and
the outer panel has a fastened portion formed as a thin thickness portion having a plate thickness smaller than that of a portion other than the fastened portion.

2. The resin back door according to claim 1, further comprising
a resin spoiler fastened to the outer panel and the reinforcing member with a fastener, at an upper end portion of the resin back door in a vehicle vertical direction.

* * * * *